US006945908B2

(12) United States Patent
Luft et al.

(10) Patent No.: US 6,945,908 B2
(45) Date of Patent: Sep. 20, 2005

(54) ELECTRONIC TRANSMISSION THROTTLE VALVE ACTUATOR

(75) Inventors: Juergen Luft, Macomb, MI (US); Andre Veinotte, Dresden (CA); Gary Michael Everingham, Chatham (CA)

(73) Assignee: Siemens VDO Automotive Inc., Chatham, CA (US)

( * ) Notice: Subject to any disclaimer, the term of this patent is extended or adjusted under 35 U.S.C. 154(b) by 69 days.

(21) Appl. No.: 10/736,704

(22) Filed: Dec. 17, 2003

(65) Prior Publication Data
US 2004/0171459 A1 Sep. 2, 2004

Related U.S. Application Data
(60) Provisional application No. 60/434,114, filed on Dec. 17, 2002.

(51) Int. Cl.$^7$ .............................................. F16H 61/26
(52) U.S. Cl. .................................................. 477/138
(58) Field of Search .............................. 477/115, 121, 477/138

(56) References Cited

U.S. PATENT DOCUMENTS 4,561,055 A * 12/1985 McKee ........................ 701/52
6,502,542 B1   1/2003 Stuart
6,513,491 B1   2/2003 Harvey
6,538,555 B2   3/2003 Fliegner

* cited by examiner

Primary Examiner—Dirk Wright

(57) ABSTRACT

An automatic transmission that includes a housing, gear transmission unit, transmission throttle valve, and an electromagnetic actuator for the transmission throttle valve. The transmission housing has a support portion formed on an outside surface of the housing, and a coupling portion is provided proximate the support portion. The gear transmission unit is disposed in the housing and has at least one hydraulic actuator controllable to provide a plurality of output speeds from the gear transmission unit. The transmission throttle valve is operable to regulate the hydraulic pressure provided to the hydraulic actuators. The transmission throttle valve includes a transmission throttle valve shaft proximate the coupling portion. The electromagnetic actuator is coupled to the support portion of the housing. The electromagnetic actuator is coupled to the transmission throttle valve shaft to regulate the hydraulic pressure of the transmission throttle valve. Method of actuating an automatic transmission throttle valve is also shown and described.

20 Claims, 5 Drawing Sheets

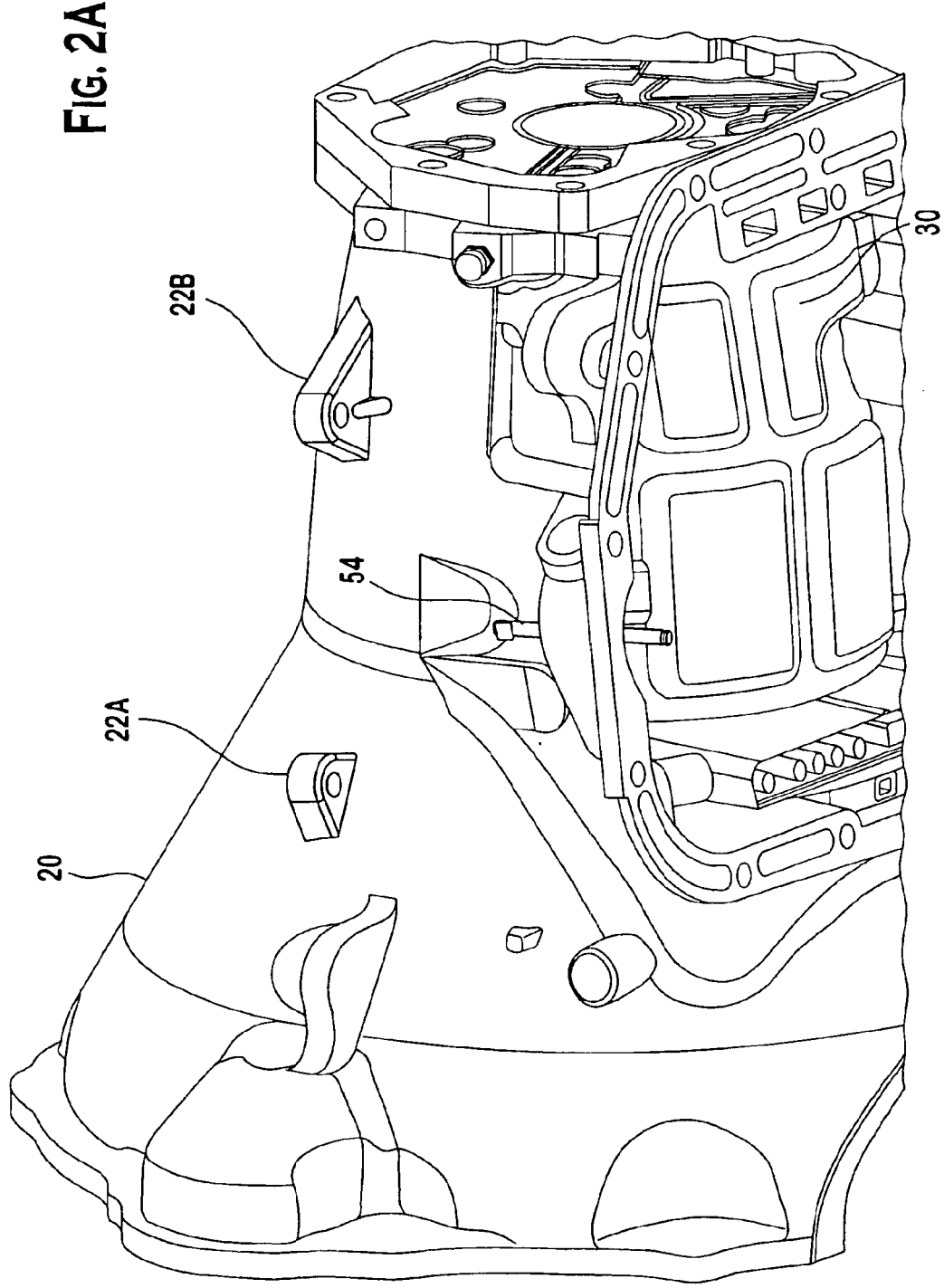

ELECTRONIC TRANSMISSION THROTTLE VALVE ACTUATOR

PRIORITY

This application claims the benefits under 35 U.S.C. § 119 of U.S. Provisional Patent Application Ser. No. 60/434,114 filed on 17 Dec. 2002, entitled "Transmission Throttle-Valve Actuator (TTVA)," which application is hereby incorporated by reference in its entirety into this application.

BACKGROUND OF THE INVENTION

In vehicles, an automatic transmission is used to transmit torque produced by an engine to drive wheels. Because the engine produces varying magnitudes of torque that must be matched to the load imposed on the vehicle through the drive wheels, the automatic transmission attempts to transmit engine torque efficiently without wasting fuel or damaging the engine and driveline. To transmit the drive torque, the automatic transmission controls the amount of torque delivered to the drive wheels by a combination of a torque converter, lock-up clutch, multi-speed geared transmission, and hydraulic control system, including one or more valves and fluid pumps, for the aforementioned components.

In controlling the automatic transmission, the hydraulic control system principally relies upon two parametric inputs to determine the appropriate magnitude of torque to be transmitted from the engine to the drive wheels: (1) the output speed of the vehicle, and (2) a load imposed on the vehicle.

The output speed of the automatic transmission can be measured at the output shaft of the automatic transmission via a governor valve. The governor valve regulates a fluid pressure provided from the fluid pump to the governor valve as a function of the vehicle speed so that the faster the vehicle moves, the greater is the fluid pressure provided by the governor valve to other hydraulic valves of the hydraulic control system.

The load on the vehicle can be measured by sensing the vacuum developed on the intake of the engine or the magnitude in which a throttle of the engine is opened or closed. The sensed load is used to control a transmission throttle valve in the hydraulic control system. The transmission throttle valve regulates the fluid pressure provided from the fluid pump to the transmission throttle valve as a function of the load on the engine. That is, the greater the load is sensed (e.g., large throttle opening or low intake tract vacuum) the greater the fluid pressure is provided by the transmission throttle valve, and the lower the load (e.g., small throttle opening or high intake tract vacuum), the lower the fluid pressure provided by the transmission throttle valve.

To control the transmission throttle valve, it has been known to physically connect the transmission throttle valve to the engine throttle or to physically connect the transmission throttle valve to a vacuum modulator (e.g., a vacuum actuated mechanism) that moves the transmission throttle valve in relation to the engine vacuum generated in the intake tract or the opening of the engine throttle valve.

The fluid pressure provided by the governor valve and the fluid pressure provided by the transmission throttle valve are generally applied in opposition to each other in one or more hydraulic valves to regulate, among other functions, a line pressure in the hydraulic control system, shift timing and shift feel of the automatic transmission. That is, by sensing these two parametric inputs, the hydraulic control system regulates torque by selecting the appropriate torque ratio change (i.e., gear ratio) and the duration of the gear ratio change as the load and speed of the vehicle are changing.

To explain the operation of the transmission throttle valve, shift valves and governor valve in the simplified example of the known automatic transmission, it is assumed, for example, that the vehicle is traveling at a constant speed in a first gear of the transmission such that the transmission throttle fluid pressure and the governor fluid pressure are provided in opposition to each other in a shift valve. When the throttle and governor pressures are at respective preset levels in the shift valve, the first gear is maintained; when the governor fluid pressure is greater than a preset amount to the transmission throttle pressure, the shift valve allows a change from the first gear to the second gear; and when the transmission throttle pressure is greater than the governor pressure by a preset amount, the shift valve prevents a change in gear ratio to provide increased acceleration or speed. In this example, when throttle is opened quickly to a full open position, the transmission throttle valve is moved (due to its physical connection to the engine throttle valve) to provide increased hydraulic fluid pressure to the shift valve in relation to the governor pressure. As such, a shift from the first gear to the second gear is delayed. On the other hand, if the speed of the vehicle has increased while the load (e.g., throttle opening) remains constant, the fluid pressure from the governor valve will be increased, relative to the throttle pressure, as delivered to the shift valve, thereby causing a shift in the gear ratio.

As discussed above, the known transmission throttle valve is actuated by a physical connection to the engine throttle valve. That is, the known transmission throttle valve is moved by a physical connection, e.g., a cable connection, with the accelerator pedal via the engine throttle. The transmission throttle valve cable connection allows the driver to directly influence the operation of the transmission throttle valve by a fixed physical relationship via the cable. Thus, the known cable connection for the transmission throttle valve is suited for its purpose in permitting the driver to influence the operation of the automatic transmission.

However, the known cable connection is believed to be disadvantageous in many aspects. For example, as the known cable connection uses a cable, e.g., a Bowden type, the cable tends to stretch over time, resulting in miscalibration of the engine throttle valve to transmission throttle valve relationship, causing delayed shift timing or improper shift timing, duration or shift feel. Further, once the cable has stretched, attempts to recalibrate the transmission throttle valve to the engine throttle valve by adjusting the cable may not be successful, leading to delayed downshifts, short shifting, delayed or hard upshifts, all of which may lead to premature clutch failure in the automatic transmission.

Furthermore, vehicles increasingly are manufactured with electronic drive-by-wire throttle valves. These electronic engine throttle valves may not operate in a manner consistent with the intended operation of the transmission throttle valve for the known automatic transmission, and therefore may lead to shifting behaviors that are not desirable. Moreover, in order to change shift duration, timing and feel, it is believed that modifications of the transmission throttle valve, valve body or the throttle cable actuator may be necessary. Additionally, it is believed that the known transmission is insufficiently precise in maintaining a constant cruise speed when placed in a cruise control mode. Consequently, it would be advantageous to provide for a transmission throttle valve mechanism that would overcome these perceived deficiencies in the known cable actuator.

SUMMARY OF THE INVENTION

There is provided, in one aspect of the present invention, an automatic transmission that includes a housing, gear transmission unit, transmission throttle valve, and an electromagnetic actuator. The housing has a support portion formed on an outside surface of the housing, and a coupling portion is provided proximate the support portion. The gear transmission unit is disposed in the housing and has at least one hydraulic actuator controllable to provide a plurality of output speeds from the gear transmission unit. The transmission throttle valve is operable to regulate the hydraulic pressure provided to the hydraulic actuators. The transmission throttle valve includes a transmission throttle valve shaft proximate the coupling portion. The electromagnetic actuator is coupled to the support portion of the housing. The electromagnetic actuator is coupled to the transmission throttle valve shaft to regulate the hydraulic pressure of the transmission throttle valve.

There is also provided, in another aspect of the present invention, an electronic transmission throttle valve actuator that includes a housing, electrical connector, position sensor, electric motor, reduction transmission, and reversing gear unit. The housing has an actuator shaft so that the actuator shaft moves a transmission throttle valve. The electrical connector is formed on the housing. The position sensor provides a signal indicating the position of the actuator shaft. The electric motor is disposed in the housing. The motor is connectable to a control unit via the electrical connector. The reduction transmission is disposed in the housing and connected to the electric motor and the actuator shaft via a sector gear mounted on the actuator shaft. The reversing gear unit is disposed in the housing and coupled to the actuator shaft to drive an output gear having a flexible shaft coupling.

There is yet also provided, in another aspect of the present invention, a method of actuating a transmission throttle valve disposed in an automatic transmission. The method can be achieved by providing a shaft coupled to the transmission throttle valve so that the transmission throttle valve is controlled by the shaft; and positioning the shaft with an electric motor disposed external to the automatic transmission.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

FIG. 2A illustrates the automatic transmission of FIG. 1 in a perspective view without the electronic transmission throttle valve.

DETAILED DESCRIPTION OF THE PREFERRED EMBODIMENT

Figure 1:
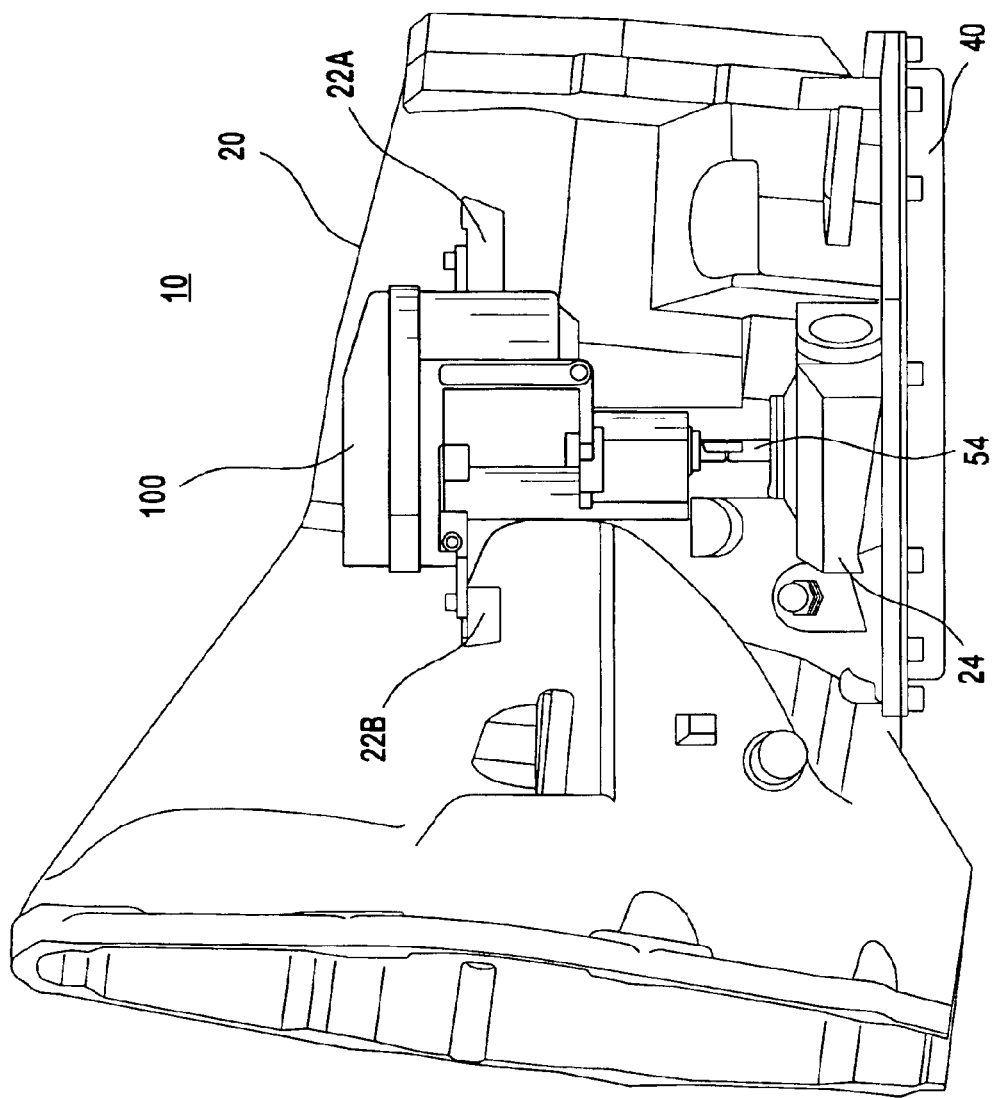
FIG. 1 illustrates an automatic transmission according to a preferred embodiment.

FIGS. 1–4 illustrate the preferred embodiments. Referring to FIG. 1, an automatic transmission 10 for a vehicle is shown. The automatic transmission 10 includes transmission housing 20 that encloses a fluid type torque converter (not shown for clarity), gear transmission unit 30 (FIG. 3), hydraulic control unit 40 that includes a transmission throttle valve 50, and an electronic transmission throttle valve actuator ("ETTVA") 100. Preferably, the gear transmission unit 30 and associated hydraulic control unit 40 can be transmission components made by Daimler-Chrysler Corporation as Model RE48.

The transmission housing 20 has a support portion formed on an outside surface of the housing. The support portion preferably includes two support tabs 22A, 22B that can be preferably formed integrally with the transmission housing 20. The transmission housing 20 also has a coupling portion 24 provided proximate the support tabs 22A, 22B. The support tabs 22A, 22B allow the ETTVA 100 to be assembled to the automatic transmission 10 during the manufacturing of the transmission. Preferably, the support tabs 22A, 22B allow the ETTVA 100 to be installed, removed and replaced from the automatic transmission 10. Alternatively, the support tabs 22A, 22B can be configured to be threaded or coupled to an existing automatic transmission to allow the existing automatic transmission to be retrofitted for operation with the ETTVA 100. That is, an existing transmission throttle valve actuator such as a cable type mechanism can be removed from an existing transmission so that a preferred embodiment of the ETTVA 100 can be installed in place of the existing actuator.

The gear transmission unit 30 is disposed in the transmission housing 20, and has at least one hydraulic actuator controllable by a hydraulic control unit 40 to provide a plurality of output speeds. The hydraulic control unit 40 has a transmission throttle valve 50 (FIG. 2B) located in the control unit 40 (e.g., a valve body) with a spool valve shaft 52 that is operable to regulate the hydraulic pressure provided by pump P to at least one hydraulic actuator or clutch pack of the automatic transmission 10. The transmission throttle valve 50 includes a transmission throttle valve shaft 54 coupled to the spool valve shaft 52. The transmission throttle valve shaft 54 is located proximate the coupling portion 24 and preferably extends through the transmission housing 20 and outside of the transmission housing 20.

Referring to FIG. 2A, the ETTVA 100 can be coupled to the support portion of the housing via the support tabs 22A, 22B so that the actuator 100 can be coupled to the transmission throttle valve shaft 54. By coupling the ETTVA 100 to the transmission throttle valve shaft 54, the ETTVA 100 can control the transmission throttle valve 50 independently of the engine throttle valve (not shown). This feature, in turn, allows the ETTVA 100 to regulate the hydraulic pressure $P_{th}$ of the transmission throttle valve 50 according to multiple shift patterns and combination thereof instead of one or more fixed shift patterns as is the case for the known transmission throttle valve cable actuator.

Figure 2B:
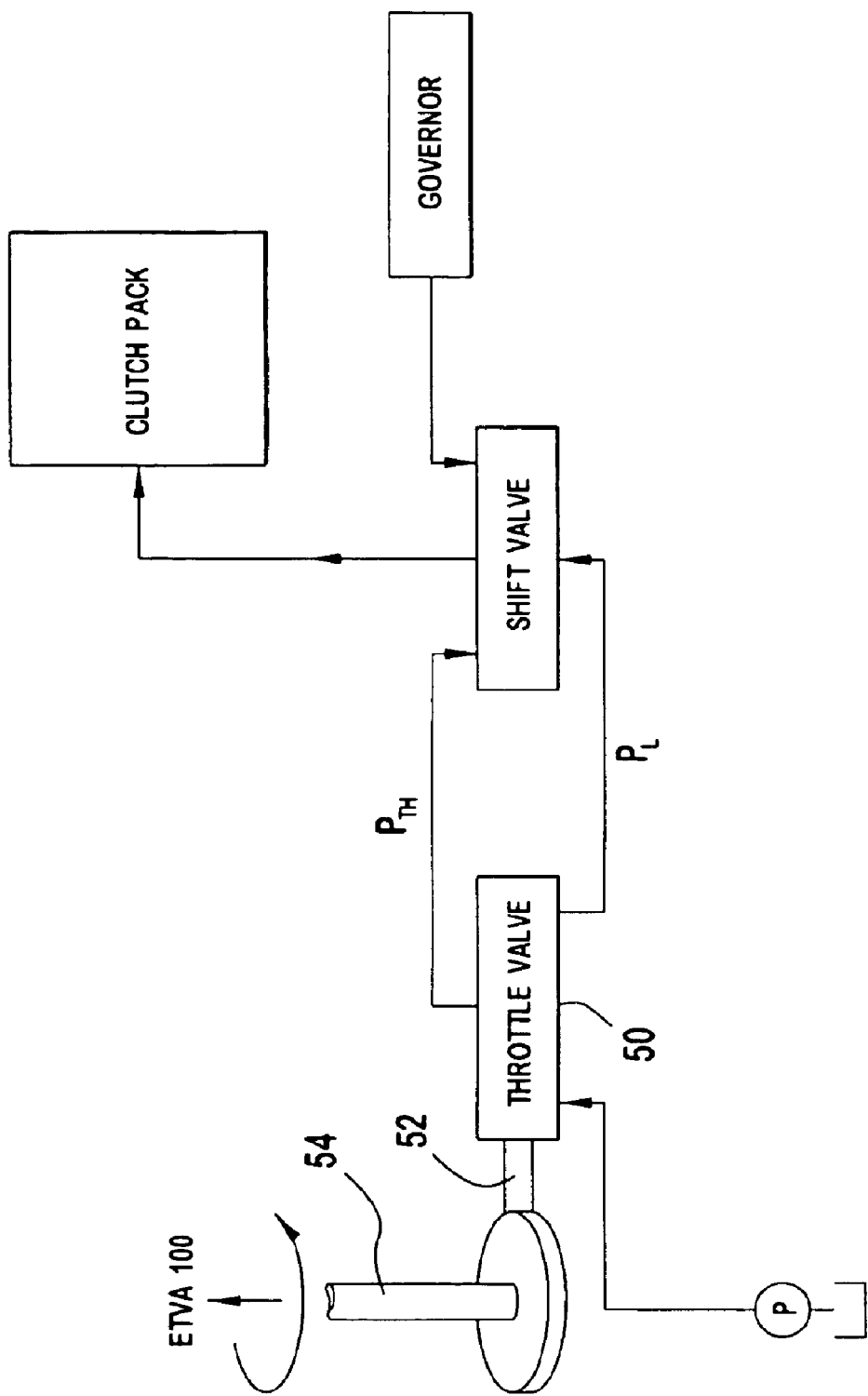
FIG. 2B illustrates an example of a hydraulic transmission control circuit utilizing an electronic transmission throttle shift valve shown in FIG. 1.

Referring to a simplified schematic representation of the hydraulic control unit 40 of the automatic transmission 10 in FIG. 2B, a pump P provides a pressurized fluid to the transmission throttle valve 50. The transmission throttle valve 50 principally regulates the throttle pressure $P_{th}$ and the line pressure $P_L$ of the hydraulic control unit 40 that are provided to one or more shift valves Sv. A governor pressure $P_G$, representing the vehicle speed, is also provided to the shift valve Sv to assist in the regulation of a shift by the shift valve Sv. The shift valve Sv is principally controlled the throttle pressure $P_{th}$ and the governor pressure Pg. As can be seen in FIG. 2B, the movement of the throttle valve 50 is controlled by movement of the transmission throttle valve shaft 54. The throttle valve 50 can be provided with a biasing spring (not shown) in the valve 50 that biases the shaft 52 towards a minimal throttle pressure $P_{th}$.

Figure 3:
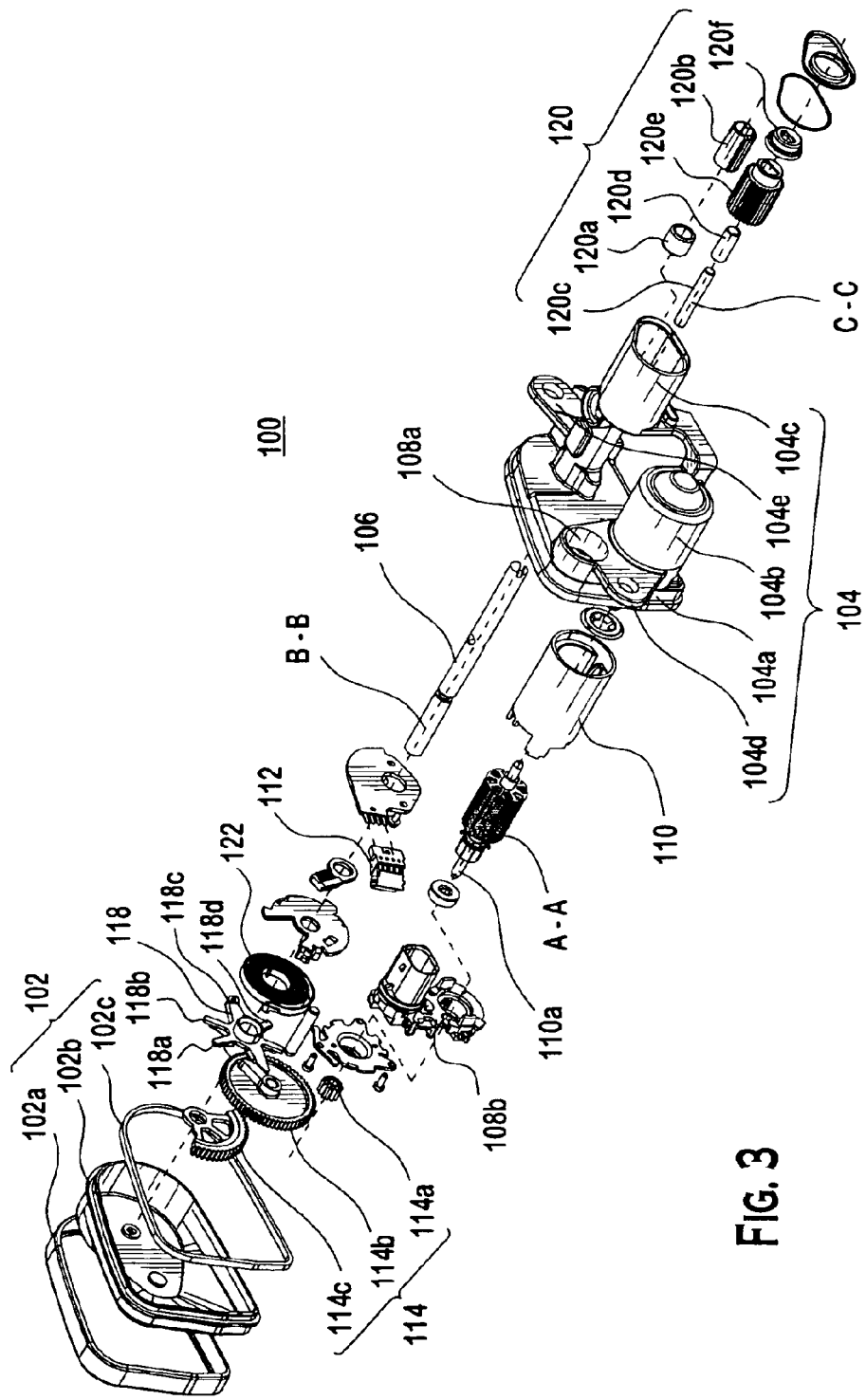
FIG. 3 illustrates an exploded view of the electronic transmission throttle valve shown in FIG. 1.

Referring to FIG. 3, a preferred embodiment of the ETTVA 100 is shown in an exploded view. The ETTVA 100 includes a preferably two-part housing 102, 104 provided with an actuator shaft 106, which moves a transmission throttle valve 50 via a reversing transmission 120. The first actuator housing part 102 has a cap retainer 102a, cap 102b, and cap seal 102c. The second actuator part 104 has main compartment 104a, motor compartment 104b, reversing transmission compartment 104c, and connecting tabs 104d and 104e. The second actuator part 104 can be provided with a connector access port 108a and electrical connector 108b extending through the access port 108a. The connector 108b facilitates bi-directional electrical communication between a control unit (not shown), electric motor 110, and position sensor 112 in the ETTVA 100. The position sensor 112 preferably provides a signal indicating the position of the actuator shaft 106 relative to a referential datum. Preferably, the position sensor 112 is a resistive type position sensor.

In a preferred embodiment, the ETTVA 100 can be coupled to the support tabs 22a and 22b via respective connecting tabs 104d and 104e with a flexible grommet disposed between each of the connecting tabs and support tabs. A threaded bolt can extend through the grommet via an insert bushing so as to connect the grommet (which couples each connecting tabs via a circumferential groove formed on the grommet) to each support tab. By coupling the connecting tabs to the support tabs via a grommet and threaded connector, vibration and thermal transfer are believed to be reduced. Moreover, by providing the grommet, any misalignment between the connecting tabs 104d and 104e with the respective support tabs 22a and 22b when the ETTVA 100 is coupled to shaft 54 is compensated by the compliant grommet, thereby reducing misalignment stress on the coupling between the shaft 54 and the ETTVA 100 or between the connecting tabs 104d, 104e and support tabs 22a and 22b.

The electric motor 110 is disposed in the housing 104 so that each end of the motor 110 is disposed along axis A—A. The electric motor 110 can be a linear motor or preferably a rotary electric motor. Where the electric motor 110 is configured as a linear motor, the linear electric motor can be connected to an actuator shaft 106 so that the position of the actuator shaft 106 is positionable by a control unit in a linear motion. Preferably, the electric motor 110 is configured as a bi-directional rotary electric motor.

The ETTVA 100 also includes a reduction transmission 114 disposed in the main compartment 104a. The transmission 114 is connected to the electric motor 110 and the actuator shaft 106 via a sector gear mounted on the actuator shaft 106 extending along axis B—B. The reduction ratio between the motor 110 and the shaft 106 is preferably 12:1 (e.g., 12 rotations of the motor for one rotation of the shaft 106). The reduction transmission 114 can include a pinion gear 114a mounted to the motor output shaft 110a, pinion gear 114b meshing with pinion gear 114a and sector gear 114c. The pinion gears 114a and 114b are mounted to a retainer 116. These components are preferably polymeric in construction, and are disposed within the main compartment 104a. Preferably, the reduction transmission 114 provides approximately a 12:1 gear reduction.

As noted above, the actuator housing 104 has first and second compartments 104b and 104c. The first compartment 104b encloses the electric motor 110. The second compartment 104c encloses the reversing transmission 120. The reversing gear unit 120 can include a needle roller bearing 120a to support the actuator shaft 106, actuator shaft drive gear 120b, driven shaft 120c with bearing 120d mounted for rotation on axis C—C, driven gear 120e, and coupling 120f with a D-aperture for coupling with shaft 54 of the transmission throttle valve 50. By virtue of the reduction transmission 114 and reversing transmission 120, the position of the actuator shaft 106 is positionable by a control unit (not shown), which can be the engine control unit, the electronic engine throttle control unit, or an electronic transmission control unit. The drive gear 120b, driven shaft 120c, and driven gear 120e of the reversing transmission 120 can be of a suitable material, such as, for example, metal, powdered metal or polymeric. Preferably, the gears in the reversing transmission 120 are powdered metal gears.

Preferably, the reversing transmission 120 has at least one involute gear formed over at least ¼ of the circumference of a gear body, i.e., the gears are distributed preferably at least 90 degrees about a longitudinal axis of the gear body to provide about 5 involute gear teeth thereon. In particular, the drive gear 120b can include a gear body with a length of about 25 millimeters that has approximately five gear teeth over a sector of about 135 degrees with a pitch diameter of about 14 millimeters, pressure angle of about 20 degrees, and a diameter at the root of teeth being approximately 13.2 millimeters. The driven gear 120e can include a gear body with an overall length of about 32 millimeters with five gear teeth disposed over a sector of about 85 degrees about the axis C—C of the gear body with a pressure angle of about 20 degrees and diameter at the root of the teeth being approximately 22 millimeters.

An optional limp home mechanism 118 can also be provided for the ETTVA 100 to place the transmission throttle valve 50 in a mode to provide sufficient hydraulic pressure for operation of one or more gears in a failsafe mode. In a preferred embodiment, the limp home mechanism 118 is coupled to a return spring 122 to place the transmission throttle valve 50 in a position that provides sufficient hydraulic pressure to permit the transmission to operate whenever there is a power failure or a failure of the electric motor 110.

Figure 4:
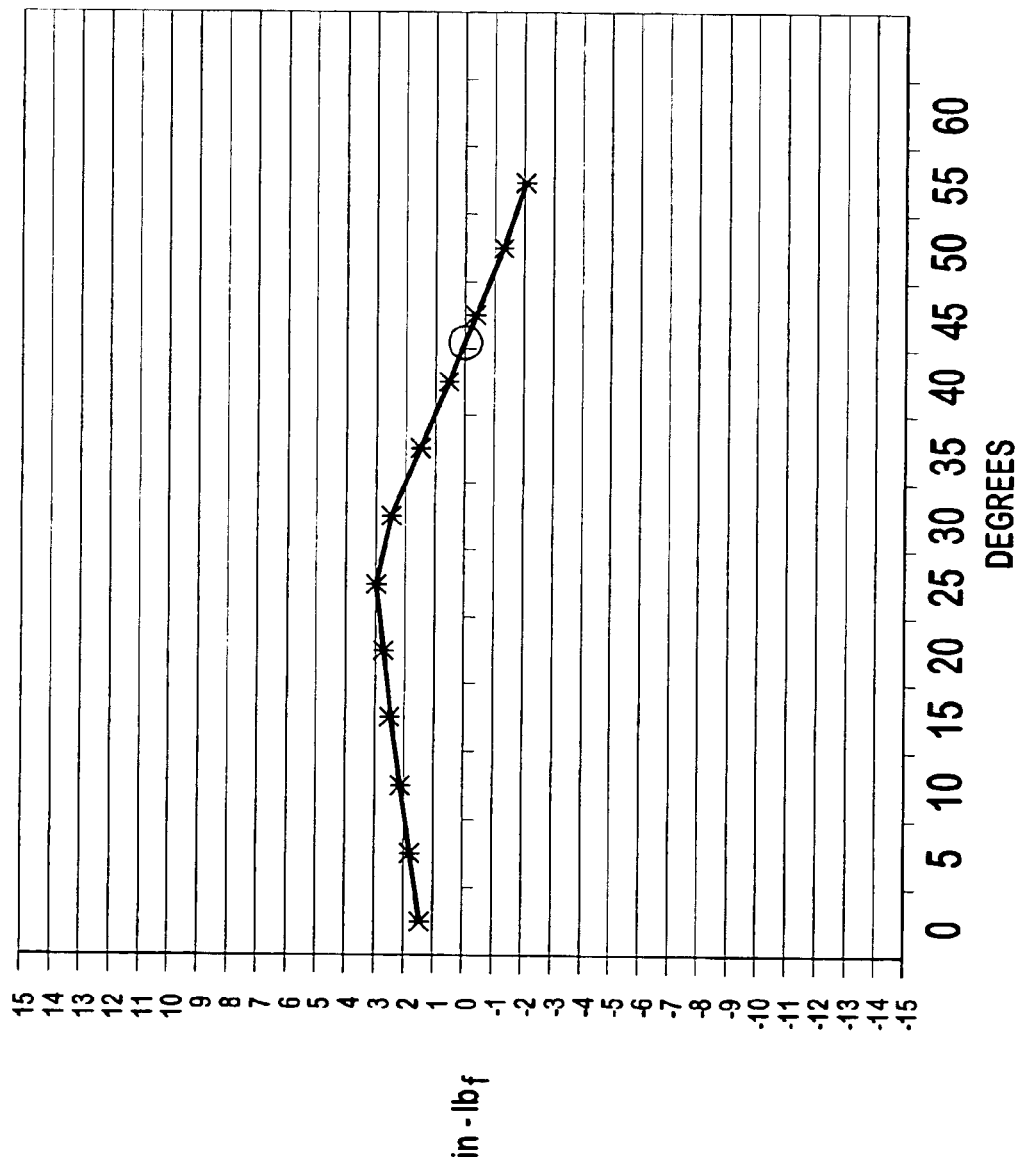
FIG. 4 illustrates a chart of the summation of torque produced at an output gear of the actuator based on the torque of the electric motor, return spring force and biasing force of the transmission throttle valve.

An example of an operation of the optional limp home mode of the ETTVA 100 with limp home mechanism 118 is shown in FIG. 4. In FIG. 4, various summations of the torque on the D-coupling 120f such as, for example, the torque developed by the motor, the counter torque provided by the return spring 120, and the bias force of the shift valve 50. The various summed torque values acting on the D-coupling 120f are shown on a line extending from 0 degree to about 55 degrees of rotation, at an interval of 5 degrees, from a set referential datum. Initially, the driven gear 120e rotates D-coupling 120f toward an angular position of about 25 degrees from referential datum. However, as the angular position of about 25 degrees is approached, the return spring 122 is sufficiently wound tight due to the rotation of the motor to provide a return torque that counteracts the torque of the electric motor and the biasing force of the transmission throttle valve acting through shaft 54. Consequently, whenever there is a failure in the electric motor 110, the return spring 122 can rotate the actuator shaft 106 to a range of angular positions dictated as a function of parameters such as, for example, the return spring force and the biasing force of the transmission shift valve 50 acting through shaft 54. It has been determined, in power failure testing, that the shaft 54 tends to rotate to an angular position (as circled in FIG. 4), which can be approximately 45 degrees from the referential datum, which position is sufficient to provide a throttle pressure other than a minimum throttle pressure for the limp home function.

By providing the ETTVA 100, the transmission throttle valve 50 can be controlled to provide various throttle pressures for opposing the governor pressure of the hydraulic control unit 40. Consequently, the transmission throttle valve 50 and governor valve are used to principally control the line pressure, shift duration and timing of the automatic transmission 10 via the ETTVA 100. As the electric motor 110 of the ETTVA 100 rotates over various angular positions about axis A—A, the transmission throttle valve 50 is controlled to provide corresponding throttle pressure levels that, in conjunction with the governor pressure valve, regulate the automatic transmission 10. The rotation of the electric motor 110 can be configured so that the actuator shaft 106 or driven shaft 120c can be continuously and variably rotated to various angular positions about axis A—A or in discrete steps with respect thereto. Furthermore, the rotation of the electric motor 110 can be configured to provide different levels of torque so as to allow the rotation to vary over time, which may provide a desired rotational response time for the transmission throttle valve 50, depending on the operational matrix of the vehicle.

In operation, electrical power is provided from a control unit (not shown) to the electric motor 110 via connector 108b which rotates pinion gear 114a. The pinion gear 114a rotates the transfer gear 114b, which rotates sector gear 114c via an additional set of gear teeth formed integrally (not shown) with the transfer gear 114b. The transfer gear 114b operates to wind the return spring 122 tight so as to develop a return torque upon actuator shaft 106 while also rotating the actuator shaft 106 via the sector gear 114c. The rotation of the actuator shaft 106 is provided to drive gear 120b, which drives the driven gear 120e. Driven gear 120e can be coupled to a D-coupling 120f that forms a connection with transmission valve drive shaft 54 so that the rotation of the electric motor 110 is provided to rotate shaft 54 of the transmission valve 50, thereby controlling the transmission throttle valve 50.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

We claim:

1. An automatic transmission for a vehicle comprising:
   a housing having a support portion formed on an outside surface of the housing, and a coupling portion provided proximate the support portion;
   a gear transmission unit disposed in the housing having at least one hydraulic actuator controllable to provide a plurality of output speeds;
   a transmission throttle valve operable to regulate the hydraulic pressure provided to the hydraulic actuators, the transmission throttle valve including a transmission throttle valve shaft proximate the coupling portion; and
   an electromagnetic actuator coupled to the support portion of the housing, the electromagnetic actuator coupled to the transmission throttle valve shaft to regulate the hydraulic pressure of the transmission throttle valve.

2. The automatic transmission of claim 1, wherein the electromagnetic actuator comprises a rotary electric motor coupled to an actuator shaft via a reduction transmission so that the position of the actuator shaft is positionable by a control unit.

3. The automatic transmission of claim 1, wherein the electromagnetic actuator comprises a linear electric motor connected to an actuator shaft so that the position of the actuator shaft is positionable by a control unit.

4. The automatic transmission of claim 2, wherein the electromagnetic actuator comprises a position sensor that provides a signal to the control unit indicating the position of the actuator shaft relative to a reference position, the actuator shaft connected to the transmission throttle valve shaft.

5. The automatic transmission of claim 2, wherein the electromagnetic actuator comprises an actuator unit disposed external to the transmission housing.

6. The automatic transmission of claim 5, wherein the reduction transmission comprises a geared reducing unit and a geared reversing unit.

7. The automatic transmission of claim 6, wherein the electric motor and reduction transmission are generally isolated thermally from the transmission housing.

8. The automatic transmission of claim 6, wherein the reduction transmission comprises a geared reduction of 12:1.

9. The automatic transmission of claim 8, wherein the reversing transmission comprises at least one involute gear formed over at least ¼ of the circumference of a gear body.

10. An electronic transmission throttle valve actuator comprising:
    a housing having an actuator shaft so that the actuator shaft moves a transmission throttle valve;
    an electrical connector formed on the housing;
    a position sensor that provides a signal indicating the position of the actuator shaft;
    an electric motor disposed in the housing the motor connectable to a control unit via the electrical connector;
    a reduction transmission disposed in the housing and connected to the electric motor and the actuator shaft via a sector gear mounted on the actuator shaft; and
    a reversing gear unit disposed in the housing, the reversing gear unit coupled to the actuator shaft to drive an output gear having a flexible shaft coupling.

11. The electronic transmission throttle valve actuator of claim 10, wherein the housing comprises a first compartment enclosing the electric motor and position sensor.

12. The electronic transmission throttle valve actuator of claim 11, wherein the housing further comprises a second compartment enclosing the reversing transmission.

13. The electronic transmission throttle valve actuator of claim 11, wherein the electric motor comprises a rotary electric motor.

14. The electronic transmission throttle valve actuator of claim 11, wherein the electric motor comprises a linear electric motor.

15. The electronic transmission throttle valve actuator of claim 12, wherein the first compartment further comprises:
    a rotary return spring coupled to the actuator shaft to bias the shaft to a reference position; and
    a stop member coupled to the reduction transmission.

16. The electronic transmission throttle valve actuator of claim 15, wherein the reduction transmission comprises a geared reduction of 12:1.

17. The electronic transmission throttle valve actuator of claim 16, wherein the reversing transmission comprises at least one involute gear formed over at least ¼ of the circumference of a gear body.

18. A method of actuating a transmission throttle valve disposed in an automatic transmission, the method comprising:

providing a shaft coupled to the transmission throttle valve so that the transmission throttle valve is controlled by the shaft; and positioning the shaft with an electric motor disposed external to the automatic transmission.

19. The method of claim 18, wherein the positioning comprises rotating the shaft over a plurality of angular positions over a regular interval of five degrees of rotation.

20. The method of claim 19, wherein the rotating comprises providing a biasing torque on the shaft depending on the angle of rotation relative to an initial position so that the shaft is rotated to an angular position of approximately 45 degrees about an axis from a referential position.

* * * * *